(12) United States Patent
Zhao et al.

(10) Patent No.: US 8,923,759 B2
(45) Date of Patent: Dec. 30, 2014

(54) METHOD AND APPARATUS FOR TRANSMITTING CPRI SIGNAL BY MEANS OF COAXIAL LINE

(71) Applicant: Huawei Technologies Co., Ltd., Shenzhen (CN)

(72) Inventors: Hu Zhao, Shenzhen (CN); Liqiong Zhang, Shenzhen (CN); Shaoming Li, Shenzhen (CN); Jianjun Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 13/870,183

(22) Filed: Apr. 25, 2013

(65) Prior Publication Data

US 2013/0237161 A1    Sep. 12, 2013

Related U.S. Application Data

(63) Continuation of application No. PCT/CN2010/078307, filed on Nov. 1, 2010.

(51) Int. Cl.
*H04B 7/24* (2006.01)
*H04B 3/54* (2006.01)
*H04W 88/08* (2009.01)
*H04B 13/02* (2006.01)

(52) U.S. Cl.
CPC .............. *H04B 3/544* (2013.01); *H04W 88/085* (2013.01)
USPC .............................................. 455/39; 455/14

(58) Field of Classification Search
USPC ....................................................... 455/14, 39
See application file for complete search history.

(56) References Cited

U.S. PATENT DOCUMENTS

| 2007/0116046 | A1 | 5/2007 | Liu et al. |
| 2010/0296469 | A1* | 11/2010 | Zhou et al. ................... 370/329 |
| 2011/0117901 | A1 | 5/2011 | Li et al. |

FOREIGN PATENT DOCUMENTS

| CN | 1960231 | 5/2007 |
| CN | 101106460 | 1/2008 |
| CN | 101557597 | 10/2009 |
| CN | 101815044 | 5/2010 |
| CN | 102217412 | 8/2014 |
| EP | 2232942 | 9/2010 |
| WO | WO 2009/089652 | 7/2009 |

OTHER PUBLICATIONS

PCT Written Opinion of the International Searching Authority mailed Jul. 28, 2011 in corresponding International Application No. PCT/CN2010/078307.

(Continued)

*Primary Examiner* — Lee Nguyen
(74) *Attorney, Agent, or Firm* — Staas & Halsey LLP

(57) ABSTRACT

Embodiments of the present invention disclose a method and an apparatus for transmitting a CPRI signal by means of a coaxial line. The method includes: converting a Common Public Radio Interface CPRI signal sent by a sending end into a parallel data stream; extracting valid data from the data stream by performing frame parsing; and converting the valid data into a transmittable analog signal, modulating the analog signal to a specified frequency, and sending it to a receiving end by means of a coaxial line. The present invention applies to transmission of a CPRI signal by means of a coaxial line.

18 Claims, 6 Drawing Sheets

(56) References Cited

OTHER PUBLICATIONS

Chinese Office Action mailed Jun. 24, 2013 in corresponding Chinese Application No. 201080003407.X.
International Search Report of PCT/CN2010/078307 mailed Jul. 28, 2011.
Chinese Office Action mailed Oct. 10, 2012 in corresponding Chinese Application No. 201080003407.X.
First Office Action, dated Oct. 10, 2012, in corresponding Chinese Application No. 201080003407.X (10 pp.).
Extended European Search Report, dated Aug. 14, 2013, in corresponding European Application No. 10851293.0 (11 pp.).

* cited by examiner

METHOD AND APPARATUS FOR TRANSMITTING CPRI SIGNAL BY MEANS OF COAXIAL LINE

CROSS-REFERENCE TO RELATED APPLICATIONS

This application is a continuation of International Application No. PCT/CN2010/078307, filed on Nov. 1, 2010, which is hereby incorporated by reference in its entirety.

FIELD OF THE INVENTION

The present invention relates to the field of communications technologies, and in particular to a method and an apparatus for transmitting a CPRI signal by means of a coaxial line.

BACKGROUND OF THE INVENTION

Currently, as the number of communications users increases and new communications standards are increasingly popular, capacity expansion often needs to be performed for a base station to increase a new standard or frequency band, so as to support more users. The CPRI (Common Public Radio Interface, Common Public Radio Interface) protocol is a common interface protocol between a baseband unit (Baseband Unit, BBU) and a radio remote unit (Radio Remote Unit, RRU) in a radio communications base station and used for a connection between a radio equipment control center (Radio Equipment Control, REC) and a radio equipment (Radio Equipment) in a radio base station.

During capacity expansion for a base station, upgrade and reconstruction may be performed on an original base station system, an optical fiber and a power supply are reconstructed, and the optical fiber is directly used to transmit a CPRI signal. However, this manner requires a large amount of engineering reconstruction and costs a lot. Therefore, for the purpose of reducing the costs, an original coaxial line may be used to transmit a CPRI signal, a CPRI electrical signal is directly output, a direct-current power supply and the electrical signal that is converted from a CPRI optical signal are combined by a bias tee and then transmitted to a tower by means of the coaxial line, then the direct-current power supply and an optical signal that is converted from the CPRI electrical signal are separated by the bias tee, and the two parts of signals are transmitted to a device on the tower.

During implementation of the present invention, the inventor finds at least the following problems in the prior art:

Transmitting a CPRI signal using a coaxial line occupies extremely high bandwidth; as a result, remaining frequency resources for other services to use are extremely few in the coaxial line; therefore, frequency resource utilization is not high.

SUMMARY OF THE INVENTION

Embodiments of the present invention provide a method and an apparatus for transmitting a CPRI signal by means of a coaxial line, which are capable of improving utilization of frequency resources in the coaxial line.

The embodiments of the present invention adopt the following technical solutions:

A method for transmitting a CPRI signal by means of a coaxial line, including:
converting a Common Public Radio Interface CPRI signal sent by a sending end into a parallel data stream;
extracting valid data from the data stream by performing frame parsing; and
converting the valid data into a transmittable analog signal, modulating the analog signal to a specified frequency, and sending it to a receiving end by means of a coaxial line.

A method for transmitting a CPRI signal by means of a coaxial line, including:
converting an analog signal sent by a sending end by means of a coaxial line into valid data;
converting the valid data into a parallel data stream; and
converting the parallel data stream into a CPRI signal and sending the CPRI signal to a receiving end.

An apparatus for transmitting a CPRI signal by means of a coaxial line, including:
a first conversion module, configured to convert a Common Public Radio Interface CPRI signal sent by a sending end into a parallel data stream;
a parsing module, configured to extract valid data from the data stream by performing frame parsing; and
a first processing module, configured to convert the valid data into a transmittable analog signal, modulate the analog signal to a specified frequency, and send the analog signal to a receiving end by means of a coaxial line.

An apparatus for transmitting a CPRI signal by means of a coaxial line, including:
a second processing module, configured to convert an analog signal sent by a sending end by means of a coaxial line into valid data;
a synthesis module, configured to convert the valid data into a parallel data stream; and
a second conversion module, configured to convert the parallel data stream into a CPRI signal and send the CPRI signal to a receiving end.

According to the method and apparatus for transmitting a CPRI signal by means of a coaxial line in the embodiments of the present invention, at a sending end, a CPRI signal is converted into a parallel data stream; valid data is extracted from the data stream by performing frame parsing; the valid data is converted into a transmittable analog signal, and the analog signal is modulated to a specified frequency and sent to a receiving end by means of a coaxial line; before the analog signal arrives at the receiving end, the analog signal sent by the sending end by means of the coaxial line is converted into valid data; the valid data is converted into a parallel data stream; and the parallel data stream is converted into a CPRI signal, and the CPRI signal is sent to the receiving end. Compared with the prior art, in the embodiments of the present invention, a CPRI signal is converted into an analog signal with relatively low bandwidth and then transmitted by means of a coaxial line. In this way, the CPRI signal can be transmitted more efficiently, and utilization of frequency resources in the coaxial line is improved.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may derive other drawings from these accompanying drawings without creative efforts.

DETAILED DESCRIPTION OF THE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

To make the advantages of the technical solutions of the present invention more comprehensible, the following describes the present invention in detail with reference to the accompanying drawings and the embodiments.

Embodiment 1

Figure 1:
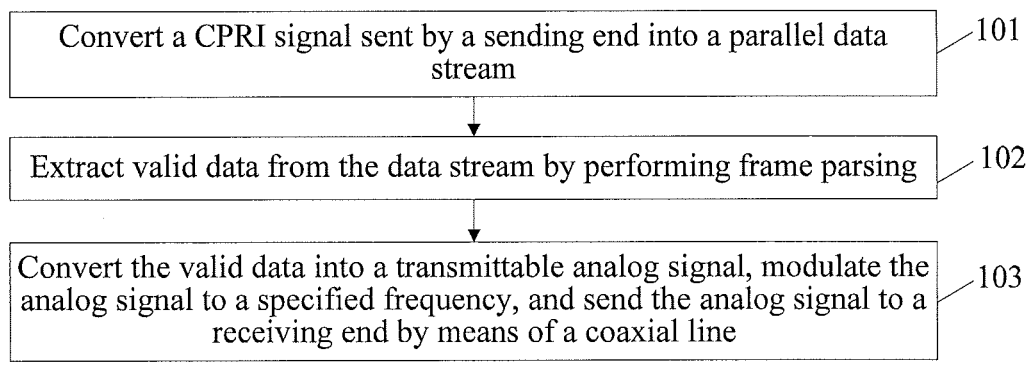
FIG. 1 is a flowchart of a method according to a first embodiment of the present invention.

This embodiment provides a method for transmitting a CPRI signal by means of a coaxial line. As shown in FIG. 1, at a sending end, the method includes:

101. Convert a CPRI signal sent by the sending end into a parallel data stream.

Specifically, a CPRI signal sent by the sending end may be converted at the physical layer into a parallel data stream.

102. Extract valid data from the data stream by performing frame parsing.

103. Convert the valid data into a transmittable analog signal, modulate the analog signal to a specified frequency, and send the analog signal to a receiving end by means of a coaxial line.

The sending end may be a BBU, and the receiving end may be an RRU; alternatively, the sending end is an RRU, and the receiving end is a BBU; alternatively, the sending end is an REC (Radio Equipment Control, radio equipment control center), and the receiving end is an RE (Radio Equipment, radio equipment); alternatively, the sending end is an RE, and the receiving end is an REC. However, the sending end and the receiving end are not limited to these.

According to the method for transmitting a CPRI signal by means of a coaxial line in this embodiment of the present invention, at a sending end, a CPRI signal is converted into a parallel data stream; valid data is extracted from the data stream by performing frame parsing; and the valid data is converted into a transmittable analog signal, and the analog signal is modulated to a specified frequency and sent to a receiving end by means of a coaxial line. Compared with the prior art, in this embodiment of the present invention, a CPRI signal is converted into an analog signal with relatively low bandwidth and then transmitted by means of a coaxial line. In this way, the CPRI signal can be transmitted more efficiently, and utilization of frequency resources in the coaxial line is improved.

Embodiment 2

Figure 2:
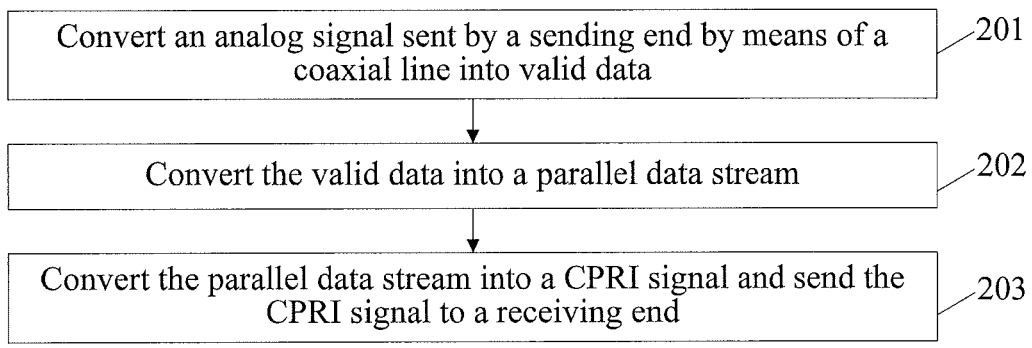
FIG. 2 is a flowchart of a method according to a second embodiment of the present invention.

This embodiment provides a method for transmitting a CPRI signal by means of a coaxial line. As shown in FIG. 2, at a receiving end, the method includes:

201. Convert an analog signal sent by a sending end by means of a coaxial line into valid data.

202. Convert the valid data into a parallel data stream.

203. Convert the parallel data stream into a CPRI signal and send the CPRI signal to the receiving end.

Specifically, the parallel data stream may be converted at the physical layer into a CPRI signal.

The sending end may be a BBU, and the receiving end may be an RRU; alternatively, the sending end is an RRU, and the receiving end is a BBU; alternatively, the sending end is an REC, and the receiving end is an RE; alternatively, the sending end is an RE, and the receiving end is an REC. However, the sending end and the receiving end are not limited to these.

According to the method for transmitting a CPRI signal by means of a coaxial line in this embodiment of the present invention, an analog signal sent by a sending end by means of a coaxial line is converted into valid data, the valid data is converted into a parallel data stream, the parallel data stream is converted into a CPRI signal, and the CPRI signal is sent to a receiving end. Compared with the prior art, in this embodiment of the present invention, a CPRI signal is converted into an analog signal with relatively low bandwidth and then transmitted by means of a coaxial line. In this way, the CPRI signal can be transmitted more efficiently, and utilization of frequency resources in the coaxial line is improved.

Embodiment 3

This embodiment provides a method for transmitting a CPRI signal by means of a coaxial line. In this embodiment, that a sending end is a BBU and a receiving end is an RRU is taken as an example. Certainly, the method in this embodiment may also apply to a scenario in which the sending end is an RRU and the receiving end is a BBU.

In this embodiment, a first apparatus connected to the sending end is set at the sending end, and a second apparatus connected to the receiving end is set at the receiving end. The first apparatus is configured to process a signal sent by the sending end and send the processed signal to the second apparatus. The second apparatus is configured to process the signal that has been processed by the first apparatus and then send it to the receiving end.

Figure 3:
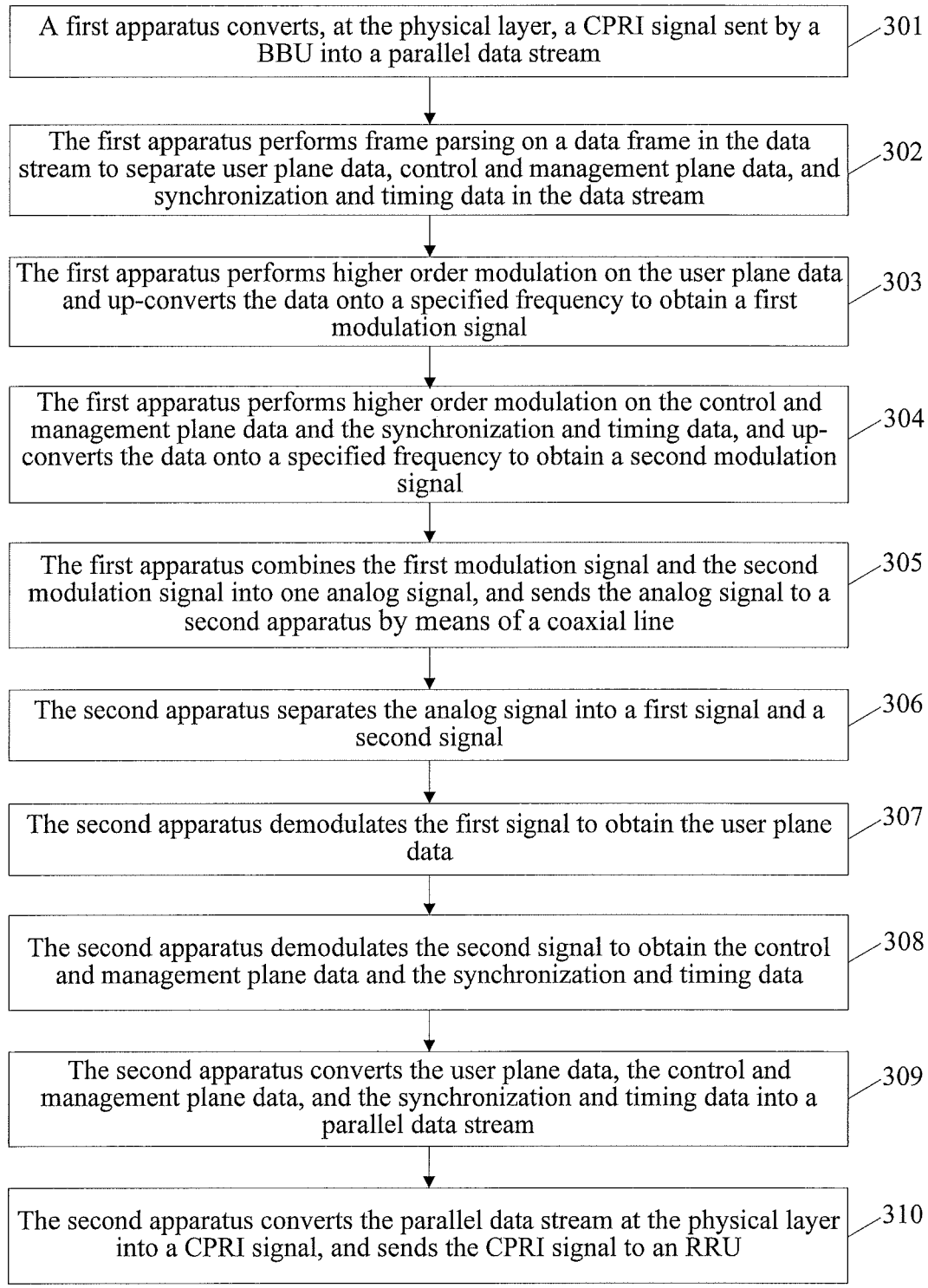
FIG. 3 is a flowchart of a method according to a third embodiment of the present invention.

As shown in FIG. 3, the method includes:

301. The first apparatus converts, at the physical layer, a CPRI signal sent by the BBU into a parallel data stream.

Figure 4:
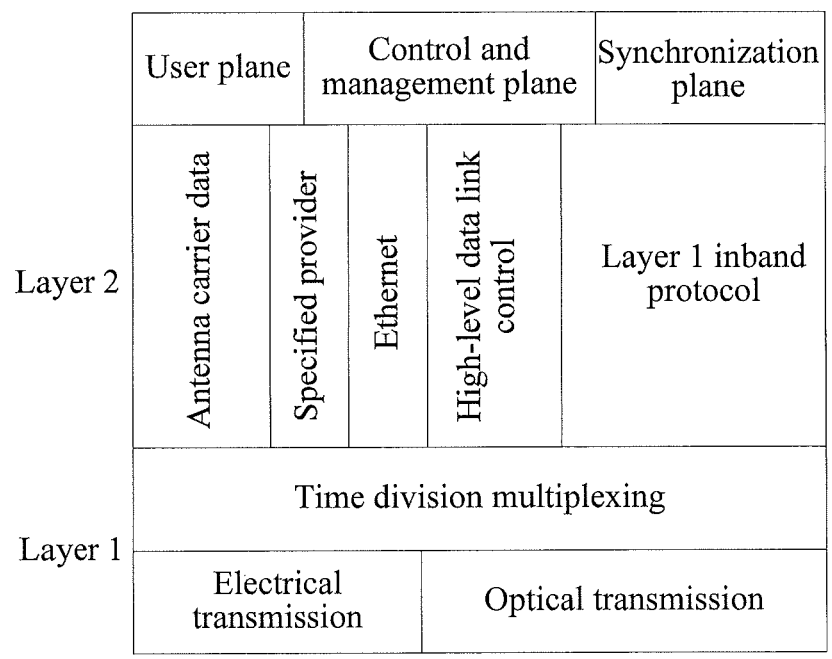
FIG. 4 is a schematic diagram of an overall framework of the CPRI protocol.

As shown in FIG. 4, the CPRI protocol is divided into two layers and three data planes. Layer 1 is the physical layer, including stipulations about optical port/electrical port specifications, a transmission rate of a line, a codec of the line, a frame format, and a transmission distance. A CPRI signal at the physical layer may be transmitted in the form of an electrical signal by means of a cable or a twisted pair cable and may also be remotely transmitted by means of an optical fiber. The transmission rate of the line may be selected from the following: 614.4 Mbit/s, 1228.8 Mbit/s, 2457.6 Mbit/s, 3072.0 Mbit/s, 4915.2 Mbit/s, and 6144.0 Mbit/s. In this case, higher flexibility is achieved for a link. At the physical layer, 8B/10B encoding is performed to ensure that encoded data has sufficient turnovers between the high level and the low level and the receiving end is capable of extracting a synchronization byte from the encoded data. Layer 2 is a data link layer and stipulates media access control, operation and maintenance data protection, a fault diagnosis function, and so on. The three data planes are a user plane (User Plane), a control and management plane (Control and Management Plane), and a synchronization plane (Synchronization Plane). The user plane mainly bears data transmitted between a base station and a terminal, that is, digital baseband (IQ) data on a user platform. The control and management plane mainly bears operation and maintenance information of Layer 1 and the higher layer. The synchronization plane mainly bears synchronization and timing information.

The conversion performed at the physical layer specifically includes parallel-to-serial conversion.

Further, the conversion performed at the physical layer may further include: performing scrambling and linear encoding on sent data and converting, by a drive, the sent data into a differential signal.

302. The first apparatus performs frame parsing on a data frame in the data stream to separate user plane data, control and management plane data, and synchronization and timing data in the data stream.

The user plane data includes data transmitted between a base station and a terminal, that is, digital baseband (IQ) data on a user platform; the control and management plane data includes operation and maintenance information of the physical layer and the higher layer; and the synchronization and timing data includes synchronization and timing information.

During transmission, the receiving end may separate the user plane data, the control and management plane data, and the synchronization and timing data according to a data format defined in the CPRI protocol. In each base frame, the first $1/16$ consecutive data is the information about synchronization and timing and the control and management plane information, and subsequent $15/16$ data is the user plane data.

303. The first apparatus performs higher order modulation on the user plane data and up-converts the data onto a specified frequency to obtain a first modulation signal.

The specified frequency is a frequency where the first modulation signal is located. On the specified frequency, the first modulation signal approaches a signal near the first modulation signal as close as possible but does not overlap the signal near the first modulation signal.

The higher order modulation may be higher order QAM (Quadrature Amplitude Modulation, quadrature amplitude modulation) but is not limited to this.

304. The first apparatus performs higher order modulation on the control and management plane data and the synchronization and timing data, and up-converts the data onto a specified frequency to obtain a second modulation signal.

The specified frequency is a frequency where the second modulation signal is located. On the specified frequency, the second modulation signal approaches a signal near the second modulation signal as close as possible but does not overlap the signal near the second modulation signal.

305. The first apparatus combines the first modulation signal and the second modulation signal into one analog signal, and sends the analog signal to the second apparatus by means of a coaxial line.

Alternatively, step 305 may also be replaced with step 305a:

305a. The first apparatus combines the first modulation signal and the second modulation signal into one analog signal, uses a bias tee (BIAS Tee) to combine the analog signal and a power supply signal that is sent by the BBU, and sends the signal that is obtained by performing the combination to the second apparatus by means of a coaxial line.

306. The second apparatus separates the analog signal into a first signal and a second signal.

Alternatively, when step 305 is replaced with step 305a, step 306 may also be replaced with step 306a:

306a. The second apparatus uses the bias tee to separate the signal that is obtained by performing the combination into an analog signal and a power supply signal and separate the analog signal into a first signal and a second signal, and sends the power supply signal to the RRU.

307. The second apparatus demodulates the first signal to obtain the user plane data.

308. The second apparatus demodulates the second signal to obtain the control and management plane data and the synchronization and timing data.

309. The second apparatus converts the user plane data, the control and management plane data, and the synchronization and timing data into a parallel data stream.

310. The second apparatus converts the parallel data stream at the physical layer into a CPRI signal, and sends the CPRI signal to the RRU.

In the prior art, when a CPRI signal is transmitted by using an original coaxial line, transmitting the CPRI signal at the rate of 2457.6 Mbit/s needs to occupy a bandwidth of 4.9152 GHz; whereas when a CPRI signal is transmitted using the method in this embodiment, transmitting the CPRI signal at the rate of 2457.6 Mbit/s needs to occupy only a bandwidth of 287.5 MHz. Therefore, utilization of frequency resources in a coaxial line can be improved by using the method in this embodiment of the present invention.

According to the method for transmitting a CPRI signal by means of a coaxial line in this embodiment of the present invention, a first apparatus converts, at the physical layer, a CPRI signal sent by a BBU into a parallel data stream, extracts valid data from the data stream by performing frame parsing, converts the valid data into a transmittable analog signal, and modulates the analog signal to a specified frequency and sends it to a second apparatus by means of a coaxial line; before the analog signal arrives at an RRU, the second apparatus converts the analog signal sent by the first apparatus by means of the coaxial line into valid data, converts the valid data into a parallel data stream, converts the parallel data stream at the physical layer into a CPRI signal, and sends the CPRI signal to the RRU. Compared with the prior art, in this embodiment of the present invention, a CPRI signal is converted into an analog signal with relatively low bandwidth and then transmitted by means of a coaxial line. In this way, the CPRI signal can be transmitted more efficiently, and utilization of frequency resources in the coaxial line is improved.

Embodiment 4

This embodiment provides a method for transmitting a CPRI signal by means of a coaxial line. In this embodiment, that a sending end is a BBU and a receiving end is an RRU is taken as an example. Certainly, the method in this embodiment may also apply to a scenario in which the sending end is an RRU and the receiving end is a BBU.

It should be noted that a first apparatus connected to the sending end is set at the sending end, and a second apparatus connected to the receiving end is set at the receiving end. The first apparatus is configured to process a signal sent by the sending end and send the processed signal to the second apparatus. The second apparatus is configured to process the signal that has been processed by the first apparatus and then send it to the receiving end.

Figure 5:
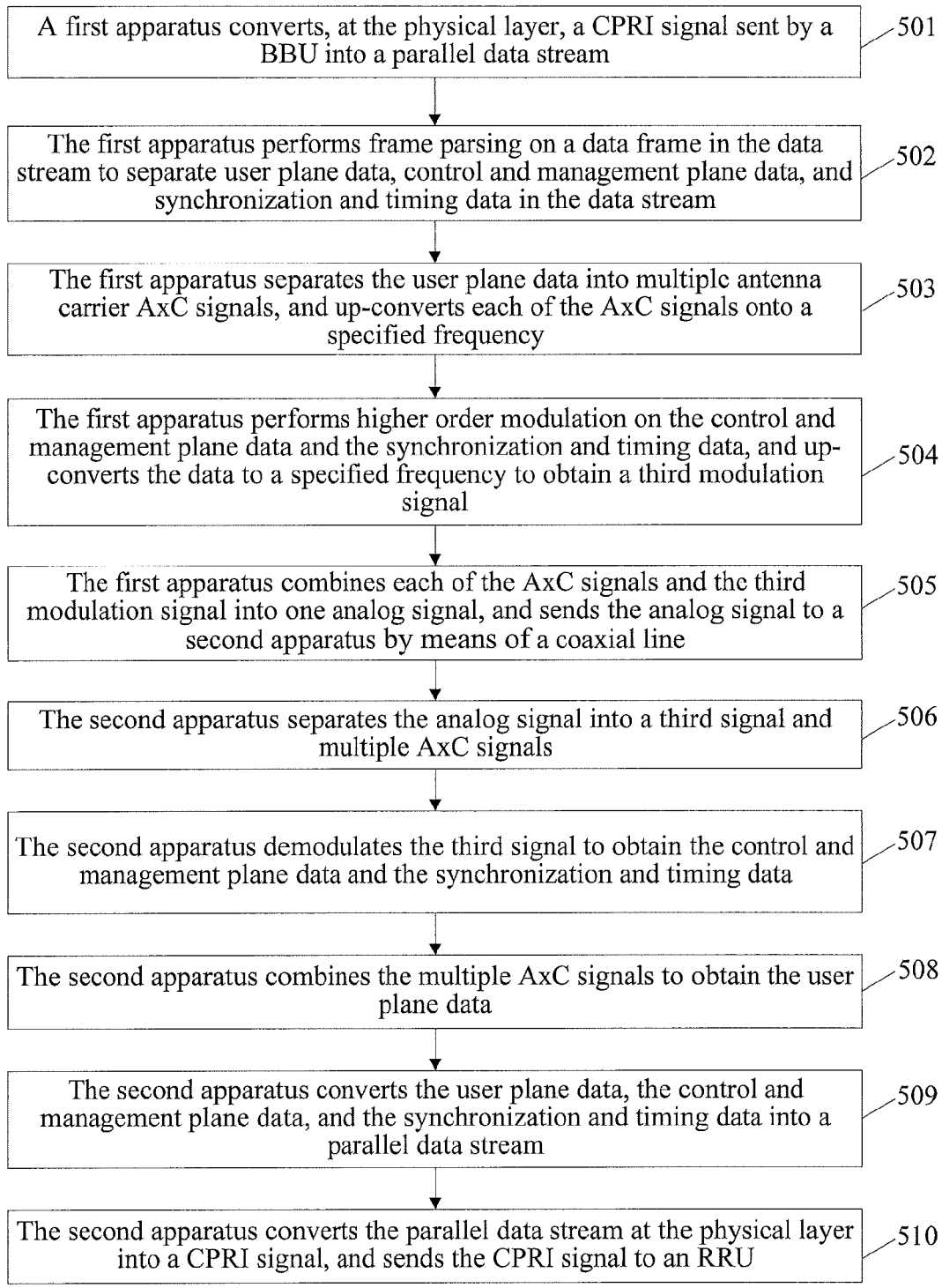
FIG. 5 is a flowchart of a method according to a fourth embodiment of the present invention.

As shown in FIG. 5, the method includes:

501. The first apparatus converts, at the physical layer, a CPRI signal sent by the BBU into a parallel data stream.

The conversion performed at the physical layer specifically includes serial-to-parallel conversion.

Further, the conversion performed at the physical layer may further include: converting an external differential signal into serial data, and performing decoding and descrambling on output data after the serial-to-parallel conversion.

502. The first apparatus performs frame parsing on a data frame in the data stream to separate user plane data, control and management plane data, and synchronization and timing data in the data stream.

The user plane data includes data transmitted between a base station and a terminal, that is, digital baseband (IQ) data on a user platform; the control and management plane data includes operation and maintenance information of the physical layer and the higher layer; and the synchronization and timing data includes information about synchronization and timing.

503. The first apparatus separates the user plane data into multiple antenna carrier AxC signals, and up-converts each of the AxC signals onto a specified frequency.

The specified frequency is a frequency where an AxC signal is located. On the specified frequency, the AxC signal approaches a signal near the AxC signal as close as possible but does not overlap the signal near the AxC signal.

504. The first apparatus performs higher order modulation on the control and management plane data and the synchronization and timing data, and up-converts the data onto a specified frequency to obtain a third modulation signal.

The specified frequency is a frequency where the third modulation signal is located. On the specified frequency, the third modulation signal approaches a signal near the third modulation signal as close as possible but does not overlap the signal near the third modulation signal.

505. The first apparatus combines each of the AxC signals and the third modulation signal into one analog signal, and sends the analog signal to the second apparatus by means of a coaxial line.

Alternatively, step 505 may also be replaced with step 505*a*:

505*a*. The first apparatus combines each of the AxC signals and the third modulation signal into one analog signal, uses a bias tee (BIAS Tee) to combine the analog signal and a power supply signal that is sent by the BBU, and sends the signal that is obtained by performing the combination to the second apparatus by means of a coaxial line.

506. The second apparatus separates the analog signal into a third signal and multiple AxC signals.

Alternatively, when step 505 is replaced with step 505*a*, step 506 may also be replaced with step 506*a*:

506*a*. The second apparatus uses the bias tee to decompose the signal that is obtained by performing the combination into an analog signal and a power supply signal and separate the analog signal into a third signal and multiple AxC signals, and sends the power supply signal to the RRU.

507. The second apparatus demodulates the third signal to obtain the control and management plane data and the synchronization and timing data.

508. The second apparatus combines the multiple AxC signals to obtain the user plane data.

509. The second apparatus converts the user plane data, the control and management plane data, and the synchronization and timing data into a parallel data stream.

510. The second apparatus converts the parallel data stream at the physical layer into a CPRI signal, and sends the CPRI signal to the RRU.

In the prior art, when a CPRI signal is transmitted using an original coaxial line, transmitting the CPRI signal at the rate of 2457.6 Mbit/s needs to occupy a bandwidth of 4.9152 GHz; whereas when a CPRI signal is transmitted using the method in this embodiment, transmitting the CPRI signal at the rate of 2457.6 Mbit/s needs to occupy only a bandwidth of 100 MHz. Therefore, utilization of frequency resources in a coaxial line can be improved by using the method in this embodiment of the present invention.

According to the method for transmitting a CPRI signal by means of a coaxial line in this embodiment of the present invention, a first apparatus converts, at the physical layer, a CPRI signal sent by a BBU into a parallel data stream, extracts valid data from the data stream by performing frame parsing, converts the valid data into a transmittable analog signal, and modulates the analog signal to a specified frequency and sends it to a second apparatus by means of a coaxial line; before the analog signal arrives at an RRU, the second apparatus converts the analog signal sent by the first apparatus by means of the coaxial line into valid data, converts the valid data into a parallel data stream, converts the parallel data stream at the physical layer into a CPRI signal, and sends the CPRI signal to the RRU. Compared with the prior art, in this embodiment of the present invention, a CPRI signal is converted into an analog signal with relatively low bandwidth and then transmitted by means of a coaxial line. In this way, the CPRI signal can be transmitted more efficiently, and utilization of frequency resources in the coaxial line is improved.

Embodiment 5

Figure 6:
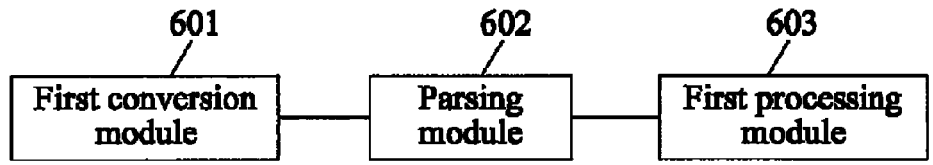
FIG. 6, FIG. 7, and FIG. 8 are schematic structural diagrams of an apparatus according to a fifth embodiment of the present invention.

This embodiment provides an apparatus for transmitting a CPRI signal by means of a coaxial line. As shown in FIG. 6, the apparatus includes:

a first conversion module 601, configured to convert a Common Public Radio Interface CPRI signal sent by a sending end into a parallel data stream, where specifically, the first conversion module 601 may convert, at the physical layer, a CPRI signal sent by the sending end into a parallel data stream;

a parsing module 602, configured to extract valid data from the data stream by performing frame parsing; and a first processing module 603, configured to convert the valid data into a transmittable analog signal, modulate the analog signal to a specified frequency, and send the analog signal to a receiving end by means of a coaxial line.

Further, the parsing module 602 is specifically configured to perform frame parsing on a data frame in the data stream to separate user plane data, control and management plane data, and synchronization and timing data in the data stream.

The user plane data includes data transmitted between a base station and a terminal, that is, digital baseband (IQ) data on a user platform; the control and management plane data includes operation and maintenance information of the physical layer and the higher layer; and the synchronization and timing data includes information about synchronization and timing.

Figure 7:
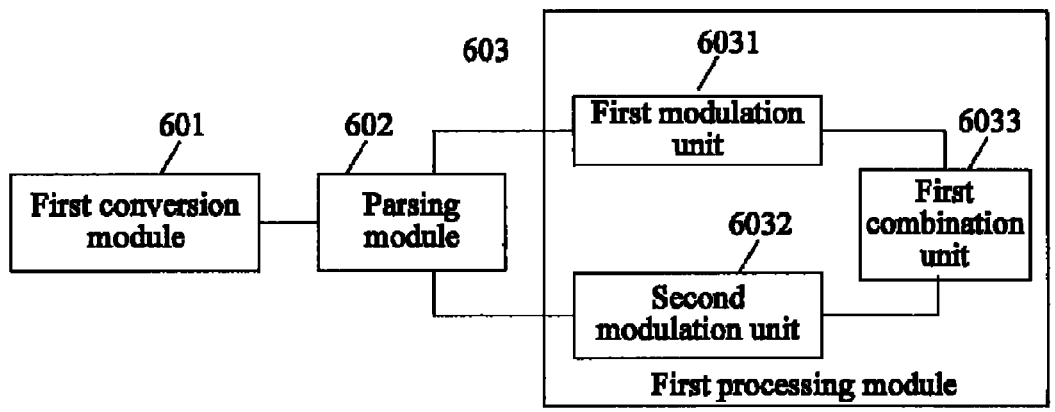

Alternatively, as shown in FIG. 7, the first processing module 603 may include:

a first modulation unit 6031, configured to perform higher order modulation on the user plane data and up-convert the data onto a specified frequency to obtain a first modulation signal, where the specified frequency is a frequency where the first modulation signal is located, and on the specified frequency, the first modulation signal approaches a signal near the first modulation signal as close as possible but does not overlap the signal near the first modulation signal;

a second modulation unit 6032, configured to perform higher order modulation on the control and management plane data and the synchronization and timing data, and up-convert the data onto a specified frequency to obtain a second modulation signal, where the specified frequency is a frequency where the second modulation signal is located, and on the specified frequency, the second modulation signal approaches a signal near the second modulation signal as close as possible but does not overlap the signal near the second modulation signal; and a first combination unit 6033, configured to combine the first modulation signal and the second modulation signal into one signal.

Figure 8:
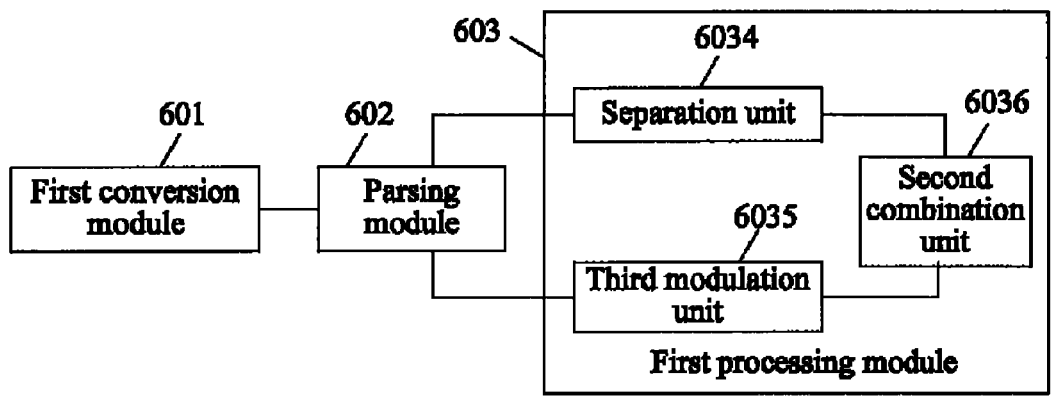

Alternatively, as shown in FIG. 8, the first processing module 603 may include:

a separation unit 6034, configured to separate the user plane data into multiple AxC signals, and up-convert each of the AxC signals onto a specified frequency, where the specified frequency is a frequency where an AxC signal is located, and on the specified frequency, the AxC signal approaches a signal near the AxC signal as close as possible but does not overlap the signal near the AxC signal;

a third modulation unit 6035, configured to perform higher order modulation on the control and management plane data and the synchronization and timing data, and up-convert the data to a specified frequency onto obtain a third modulation signal, where the specified frequency is a frequency where the third modulation signal is located, and on the specified frequency, the third modulation signal approaches a signal near the third modulation signal as close as possible but does not overlap the signal near the third modulation signal; and a second combination unit 6036, configured to combine each of the AxC signals and the third modulation signal into one signal.

In this embodiment, the sending end and the receiving end may be a BBU and an RRU, respectively. Certainly, the sending end and the receiving end may also be an RRU and a BBU, respectively.

According to the apparatus for transmitting a CPRI signal by means of a coaxial line in this embodiment of the present invention, a CPRI signal is converted into a parallel data stream; valid data is extracted from the data stream by performing frame parsing; and the valid data is converted into a transmittable analog signal, and the analog signal is modulated to a specified frequency and sent to a receiving end by means of a coaxial line. Compared with the prior art, in this embodiment of the present invention, a CPRI signal is converted into an analog signal with relatively low bandwidth and then transmitted by means of a coaxial line. In this way, the CPRI signal can be transmitted more efficiently, and utilization of frequency resources in the coaxial line is improved.

Embodiment 6

Figure 9:
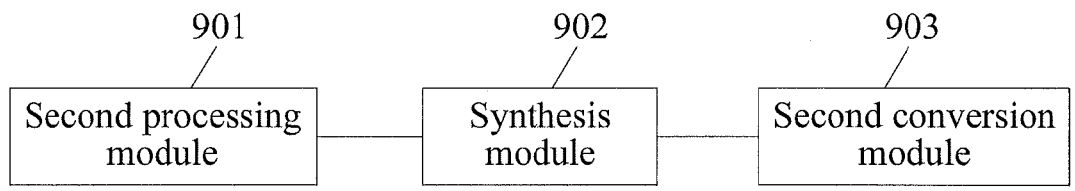
FIG. 9, FIG. 10, and FIG. 11 are schematic structural diagrams of an apparatus according to a sixth embodiment of the present invention.

This embodiment provides an apparatus for transmitting a CPRI signal by means of a coaxial line. As shown in FIG. 9, the apparatus includes:

a second processing module 901, configured to convert an analog signal sent by a sending end by means of a coaxial line into valid data;

a synthesis module 902, configured to convert the valid data into a parallel data stream; and a second conversion module 903, configured to convert the parallel data stream into a CPRI signal and send the CPRI signal to a receiving end.

Specifically, the second conversion module 903 may covert the parallel data stream at the physical layer into a CPRI signal.

Figure 10:
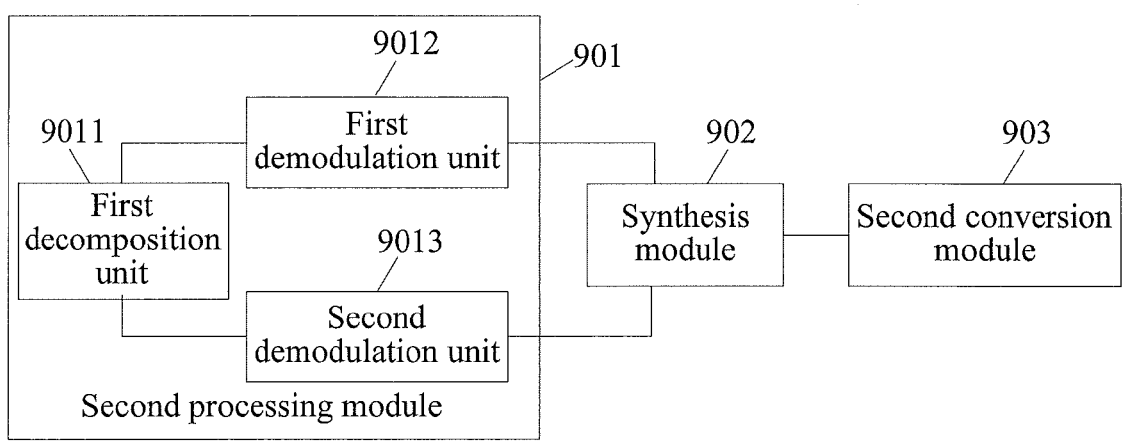

Alternatively, as shown in FIG. 10, the second processing module 901 may include:

a first decomposition unit 9011, configured to decompose the analog signal into a first signal and a second signal;

a first demodulation unit 9012, configured to demodulate the first signal to obtain user plane data; and a second demodulation unit 9013, configured to demodulate the second signal to obtain control and management plane data and synchronization and timing data.

The user plane data includes data transmitted between a base station and a terminal, that is, digital baseband (IQ) data on a user platform; the control and management plane data includes operation and maintenance information of the physical layer and the higher layer; and the synchronization and timing data includes information about synchronization and timing.

Figure 11:
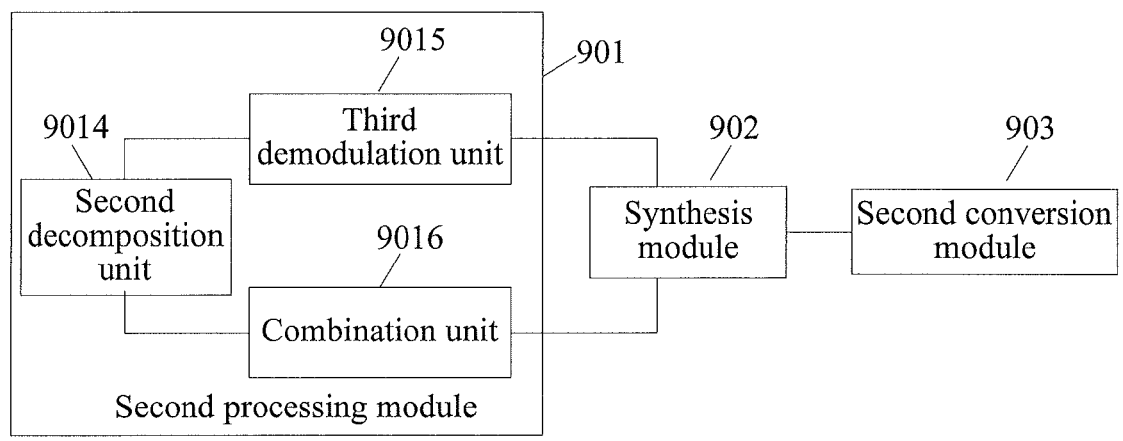

Alternatively, as shown in FIG. 11, the second processing module 901 may include:

a second decomposition unit 9014, configured to decompose the analog signal into a third signal and multiple AxC signals;

a third demodulation unit 9015, configured to demodulate the third signal to obtain control and management plane data and synchronization and timing data; and a combination unit 9016, configured to combine the multiple AxC signals to obtain user plane data.

Further, the synthesis module 902 is specifically configured to convert the user plane data, the control and management plane data, and the synchronization and timing data into a parallel data stream.

In this embodiment, the sending end and the receiving end may be a BBU and an RRU, respectively. Certainly, the sending end and the receiving end may also be an RRU and a BBU, respectively.

According to the apparatus for transmitting a CPRI signal by means of a coaxial line in this embodiment of the present invention, an analog signal sent by a sending end by means of a coaxial line is converted into valid data, the valid data is converted into a parallel data stream, the parallel data stream is converted into a CPRI signal, and the CPRI signal is sent to a receiving end. Compared with the prior art, in this embodiment of the present invention, a CPRI signal is converted into an analog signal with relatively low bandwidth and then transmitted by means of a coaxial line. In this way, the CPRI signal can be transmitted more efficiently, and utilization of frequency resources in the coaxial line is improved.

The apparatuses for transmitting a CPRI signal by means of a coaxial line in the embodiments of the present invention are capable of implementing the preceding method embodiments. The method and apparatus for transmitting a CPRI signal by means of a coaxial line in the embodiments of the present invention may apply to transmission of a CPRI signal by means of a coaxial line, but is not limited to this.

Person of ordinary skill in the art may understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a Read-Only Memory (Read-Only Memory, ROM), or a Random Access Memory (Random Access Memory, RAM).

The foregoing descriptions are merely specific embodiments of the present invention, but are not intended to limit the protection scope of the present invention. Any variation or replacement readily figured out by persons skilled in the art within the technical scope of the present invention shall fall within the protection scope of the present invention. Therefore, the protection scope of the present invention shall be subject to the protection scope of the claims.

What is claimed is:

1. A method for transmitting a CPRI signal by means of a coaxial line, comprising:
    converting a Common Public Radio Interface CPRI signal sent by a sending end into a parallel data stream;
    extracting valid data from the data stream by performing frame parsing; and
    converting the valid data into a transmittable analog signal, modulating the analog signal to a specified frequency, and sending the analog signal to a receiving end by means of a coaxial line.

2. The method according to claim 1, wherein the extracting valid data from the data stream by performing frame parsing specifically comprises:
    separating user plane data, control and management plane data, and synchronization and timing data in the data stream by performing frame parsing.

3. The method according to claim 2, wherein the converting the valid data into a transmittable analog signal and modulating the analog signal to a specified frequency comprises:
    performing higher order modulation on the user plane data and up-converting the data onto a specified frequency to obtain a first modulation signal;
    performing higher order modulation on the control and management plane data and the synchronization and timing data, and up-converting the data onto a specified frequency to obtain a second modulation signal; and
    combining the first modulation signal and the second modulation signal into one signal.

4. The method according to claim 2, wherein the converting the valid data into a transmittable analog signal and modulating the analog signal to a specified frequency comprises:
    separating the user plane data into multiple antenna carrier AxC signals, and up-converting each of the AxC signals onto a specified frequency;
    performing higher order modulation on the control and management plane data and the synchronization and timing data, and up-converting the data onto a specified frequency to obtain a third modulation signal; and
    combining each of the AxC signals and the third modulation signal into one signal.

5. A method for transmitting a CPRI signal by means of a coaxial line, comprising:
    converting an analog signal sent by a sending end by means of a coaxial line into valid data;
    converting the valid data into a parallel data stream; and
    converting the parallel data stream into a CPRI signal and sending the CPRI signal to a receiving end.

6. The method according to claim 5, wherein the converting an analog signal sent by a sending end by means of a coaxial line into valid data comprises:
    separating the analog signal into a first signal and a second signal;
    demodulating the first signal to obtain user plane data; and
    demodulating the second signal to obtain control and management plane data and synchronization and timing data.

7. The method according to claim 6, wherein the converting the valid data into a parallel data stream specifically comprises:
    converting the user plane data, the control and management plane data, and the synchronization and timing data into a parallel data stream.

8. The method according to claim 5, wherein the converting an analog signal sent by a sending end by means of a coaxial line into valid data comprises:
    separating the analog signal into a third signal and multiple AxC signals;
    demodulating the third signal to obtain control and management plane data and synchronization and timing data; and
    combining the multiple AxC signals to obtain user plane data.

9. The method according to claim 8, wherein the converting the valid data into a parallel data stream specifically comprises:
    converting the user plane data, the control and management plane data, and the synchronization and timing data into a parallel data stream.

10. An apparatus for transmitting a CPRI signal by means of a coaxial line, comprising:
    a first conversion module, configured to convert a Common Public Radio Interface CPRI signal sent by a sending end into a parallel data stream;
    a parsing module, configured to extract valid data from the data stream by performing frame parsing; and
    a first processing module, configured to convert the valid data into a transmittable analog signal, modulate the analog signal to a specified frequency, and send the analog signal to a receiving end by means of a coaxial line.

11. The apparatus according to claim 10, wherein the parsing module is specifically configured to separate user plane data, control and management plane data, and synchronization and timing data in the data stream by performing frame parsing.

12. The apparatus according to claim 11, wherein the first processing module comprises:
    a first modulation unit, configured to perform higher order modulation on the user plane data and up-convert the data onto a specified frequency to obtain a first modulation signal;
    a second modulation unit, configured to perform higher order modulation on the control and management plane data and the synchronization and timing data, and up-convert the data onto a specified frequency to obtain a second modulation signal; and
    a first combination unit, configured to combine the first modulation signal and the second modulation signal into one signal.

13. The apparatus according to claim 11, wherein the first processing module comprises:
    a separation unit, configured to separate the user plane data into multiple AxC signals, and up-convert each of the AxC signals onto a specified frequency;

a third modulation unit, configured to perform higher order modulation on the control and management plane data and the synchronization and timing data, and up-convert the data onto a specified frequency to obtain a third modulation signal; and a second combination unit, configured to combine each of the AxC signals and the third modulation signal into one signal.

14. An apparatus for transmitting a CPRI signal by means of a coaxial line, comprising:

a second processing module, configured to convert an analog signal sent by a sending end by means of a coaxial line into valid data;

a synthesis module, configured to convert the valid data into a parallel data stream; and a second conversion module, configured to convert the parallel data stream into a CPRI signal and send the CPRI signal to a receiving end.

15. The apparatus according to claim 14, wherein the second processing module comprises:

a first decomposition unit, configured to decompose the analog signal into a first signal and a second signal;

a first demodulation unit, configured to demodulate the first signal to obtain user plane data; and a second demodulation unit, configured to demodulate the second signal to obtain control and management plane data and synchronization and timing data.

16. The apparatus according to claim 15, wherein the synthesis module is specifically configured to convert the user plane data, the control and management plane data, and the synchronization and timing data into a parallel data stream.

17. The apparatus according to claim 14, wherein the second processing module comprises:

a second decomposition unit, configured to decompose the analog signal into a third signal and multiple AxC signals;

a third demodulation unit, configured to demodulate the third signal to obtain control and management plane data and synchronization and timing data; and a combination unit, configured to combine the multiple AxC signals to obtain user plane data.

18. The apparatus according to claim 17, wherein the synthesis module is specifically configured to convert the user plane data, the control and management plane data, and the synchronization and timing data into a parallel data stream.

* * * * *